United States Patent [19]
Cosby

[11] 3,787,086
[45] Jan. 22, 1974

[54] ADJUSTABLE SEAT FOR AN INDUSTRIAL VEHICLE

[75] Inventor: Henry L. Cosby, Hickory Corners, Mich.

[73] Assignee: Clark Equipment Company, Buchanan, Mich.

[22] Filed: Nov. 8, 1971

[21] Appl. No.: 196,648

Related U.S. Application Data

[62] Division of Ser. No. 34,713, May 5, 1970, Pat. No. 3,687,484.

[52] U.S. Cl.............................. 296/65 R, 180/101
[51] Int. Cl............................................. B60n 1/02
[58] Field of Search...... 248/425; 297/94, 344, 349; 296/65 R, 66, 67, 68

[56] References Cited
UNITED STATES PATENTS

| | | | |
|---|---|---|---|
| 1,768,466 | 6/1930 | Hitt et al............................. | 296/66 |
| 1,250,155 | 12/1917 | Emond.............................. | 296/65 R |
| 3,191,400 | 6/1965 | Swenson........................... | 296/65 R |
| 3,463,542 | 8/1969 | Daniels............................. | 296/65 R |
| 1,639,371 | 8/1927 | Freeman........................... | 296/65 R |

FOREIGN PATENTS OR APPLICATIONS

| | | |
|---|---|---|
| 1,401,140 | 7/1967 | France |

*Primary Examiner*—Robert G. Sheridan
*Assistant Examiner*—Lawrence J. Oresky
*Attorney, Agent, or Firm*—Kenneth C. Witt et al.

[57] ABSTRACT

A lift truck is shown to exemplify the invention in which a seat support member is pivoted at one side to allow the seat to be swung outwardly of one side of the truck from a forwardly facing operative position for operating the vehicle to a rearwardly facing non-operative position relative to a compartment housing the power source apparatus, such as an electric storage battery. A protective overhead guard device includes one pivotable and longitudinally adjustable connector and one longitudinally adjustable connector for adjusting the length of the guard for connection to a longitudinally adjustable and novel counterweight structure at different adjusted positions thereof, thereby enabling the same truck chassis to be utilized for a relatively wide range of lift truck capacities. In addition, the pivoted connector is adapted to provide an opening in the guard structure through which may pass a chain or cable of a lifting and transfer device which, with the pivoted seat structure, provides simple means for performing an efficient method of removing and replacing the power source or other devices without removing or disassembling the overhead guard or seat structure.

10 Claims, 11 Drawing Figures

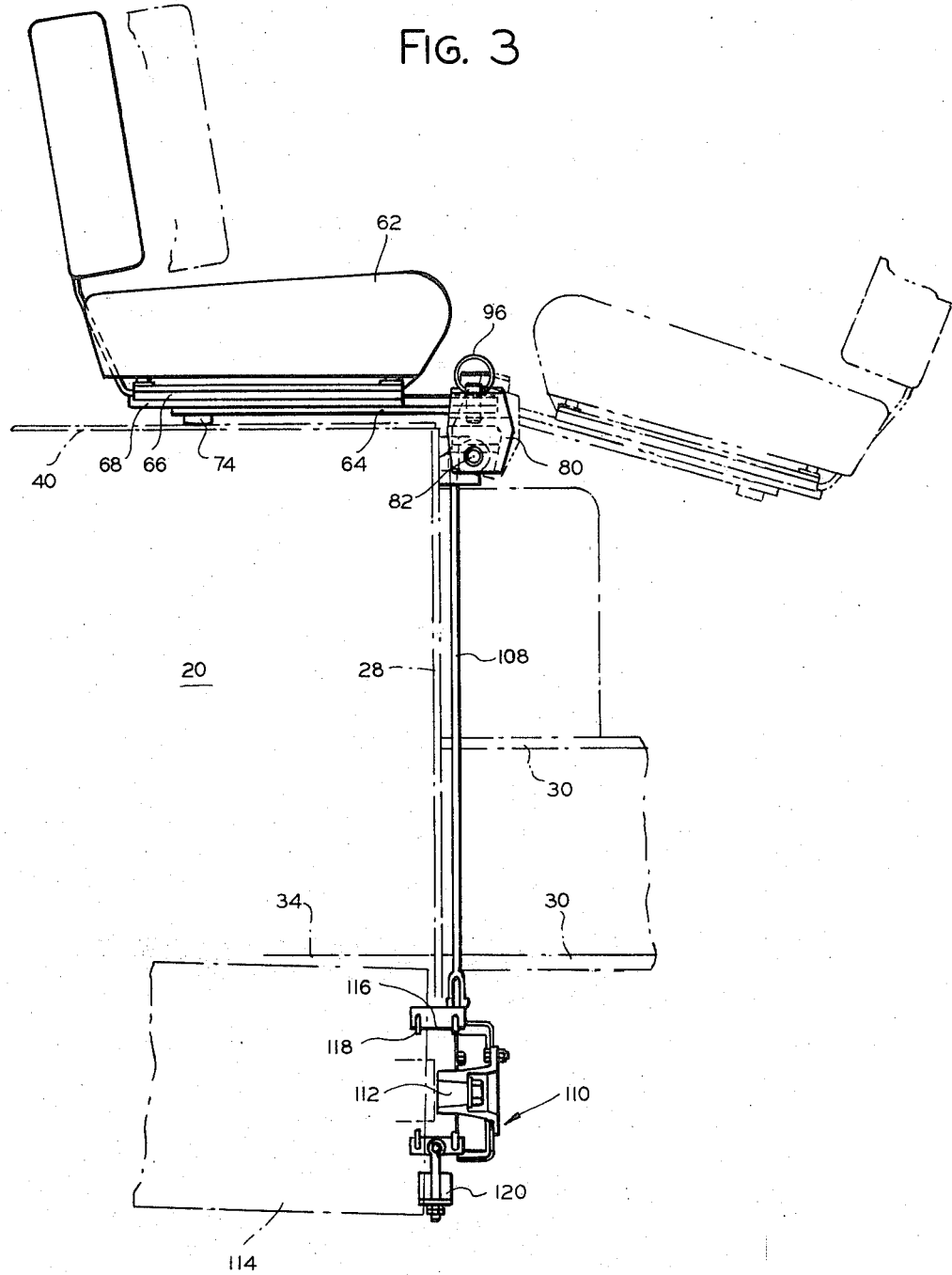

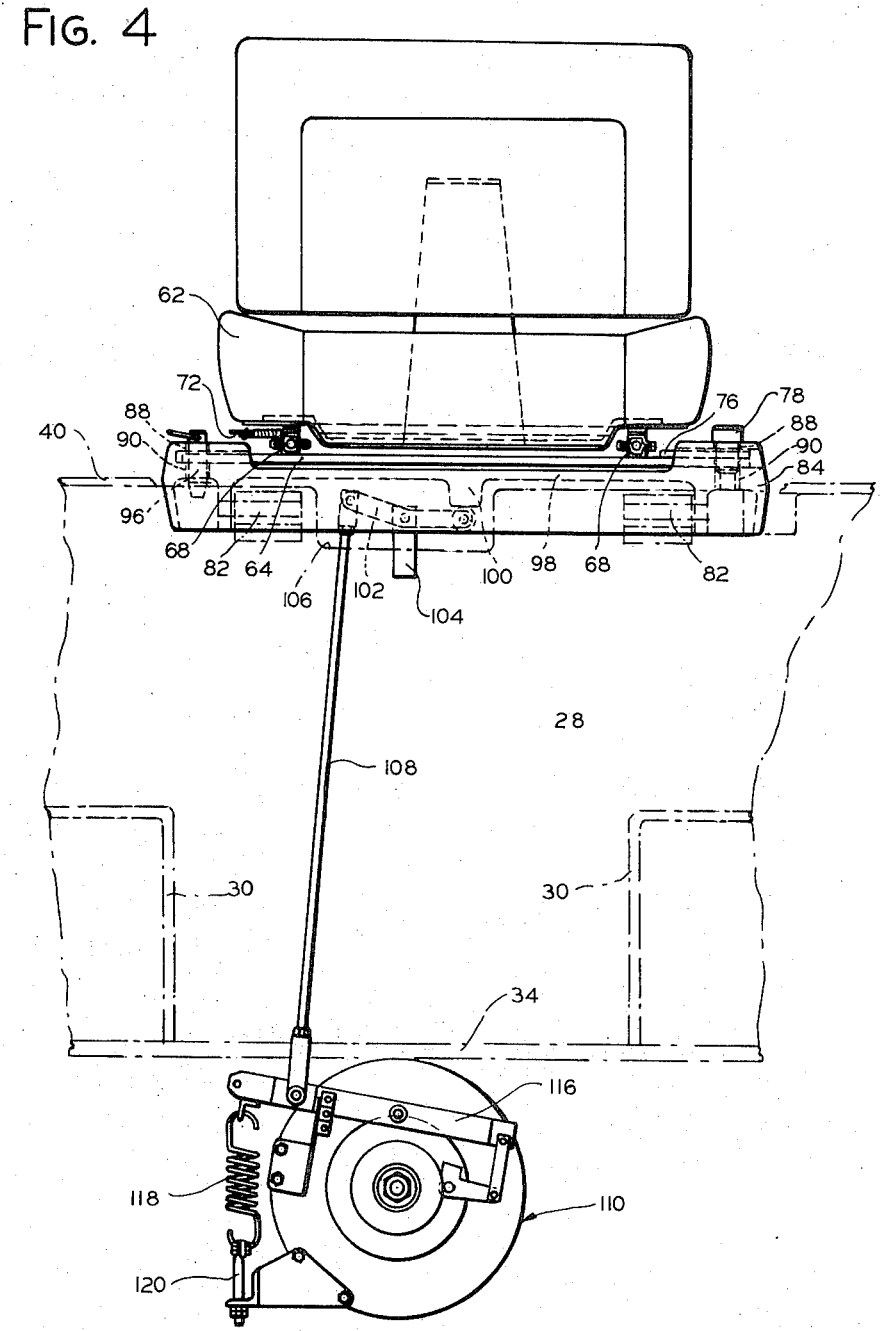

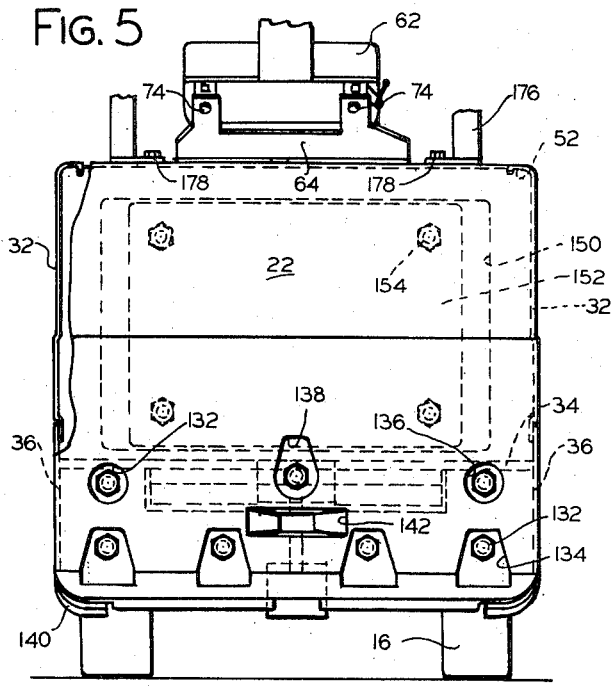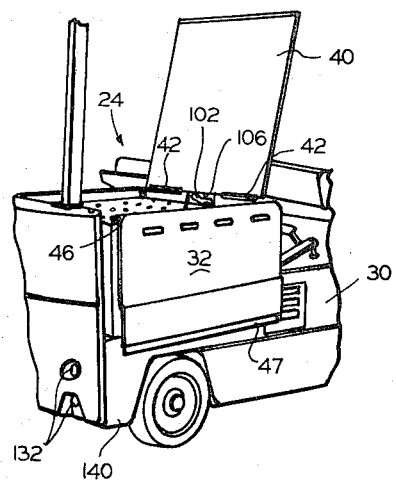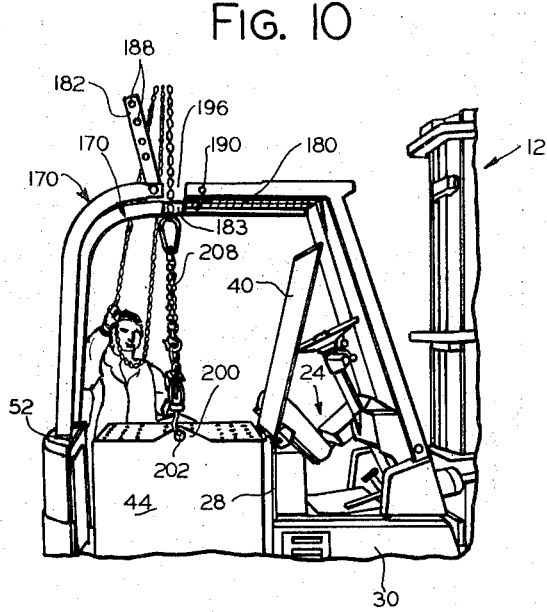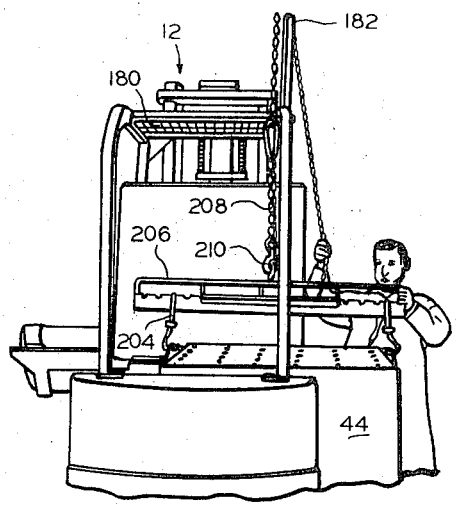

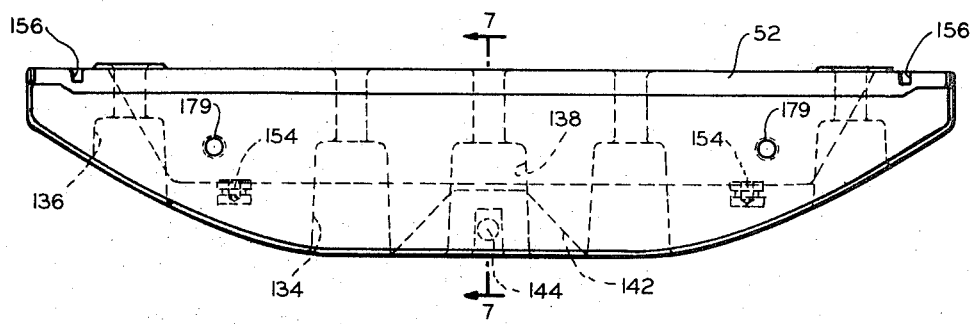
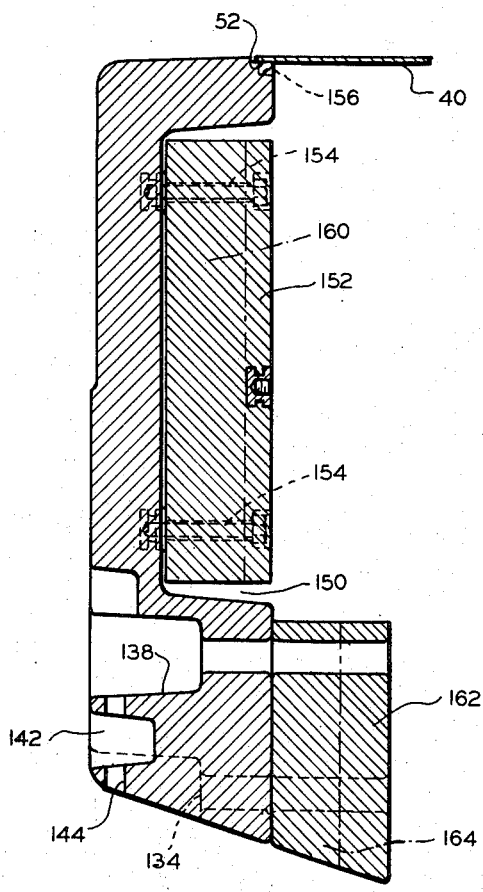
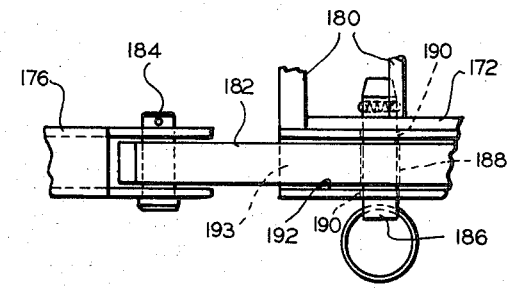

ADJUSTABLE SEAT FOR AN INDUSTRIAL VEHICLE

This application is a division of our copending U.S. Pat. application Ser. No. 34,713 filed May 5, 1970, now U.S. Pat. No. 3,687,484 issued Aug. 29, 1972, and entitled "Lift Turck." The entire disclosure of that appliation is hereby incorporated by reference into this application.

BACKGROUND OF THE INVENTION

The field of art to which this invention relates includes adjustable seat construction for industrial vehicle.

In vehicles known as lift trucks, for example, an operator's control station is normally provided adjacent the forward end of the truck and a power source, such as a battery or internal combustion engine (hereinafter referred to frequently as a "battery" for convenience only, and not by way of limitation), is disposed in the rear portion of the truck. The operator's seat is normally disposed above at least a portion of the compartment which houses the battery or other power source so that when it is desired to remove the battery, for example, by lifting it up and out of the truck chassis it is first necessary that the seat be moved to a non-interfering location, either by dismounting it from the truck or otherwise. In some lift truck designs the seat can be pivoted forwardly sufficiently to permit the battery to be lifted from the truck without interference. In other lift truck designs the position of the steering wheel in relation to the seat is such that the seat cannot be pivoted forwardly far enough to permit the latter operation. In still other prior truck designs provision is made for swinging the seat to one side of the truck and then upwardly and forwardly so as to permit removal of the battery. One such swingable seat construction is disclosed in U.S. Pat. No. 3,463,542, granted Aug. 26, 1969.

SUMMARY OF THE INVENTION

The present invention comprises a substantial improvement over known prior adjustable seat constructions which can be manipulated to enable readily, for example, the removal from or deposit in vehicles of the type to which the invention is found suitable, such as lift trucks, of a power source or other device in a vehicular compartment such as denoted above. It is therefore a primary object of the invention to provide an improved swing-out operator's seat construction.

BRIEF DESCRIPTION OF THE DRAWING

FIG. 3 shows in partial phantom view a broken-away side portion of the operator's station wherein the driver's seat is illustrated in both operative and swung-out positions in relation to the station and in relation to a drive motor brake device;

FIG. 4 is a front view of FIG. 3 which shows the operator's seat only in its normal operative position with the seat brake actuated to a disengaged position;

FIG. 5 is a partial rear elevational view of the truck as shown in FIG. 1;

FIG. 6 is a plan view of the counterweight structure shown in FIG. 5;

FIG. 7 is a sectional view taken along line 7—7 of FIG. 6 and showing also means associated therewith for adjusting the spacing of the counterweight from the main truck chassis and for varying the mass of the counterweight;

FIG. 8 is an enlarged partial plan view of the connecting link structure associated with one side of the overhead guard;

FIG. 9 is a partial rear quarter perspective view of the truck of FIG. 1 showing a cover hood of the battery compartment in a raised position and a side panel portion in exploded view in relation to the one side of the truck for opening or exposing that side when the battery is to be removed or installed; and FIGS. 10 and 11 are partial side and rear perspective veiws, respectively, illustrating a method of removing from a lift truck power source equipment, viz., an electric storage battery as illustrated.

DESCRIPTION OF THE PREFERRED EMBODIMENT

Figure 1:
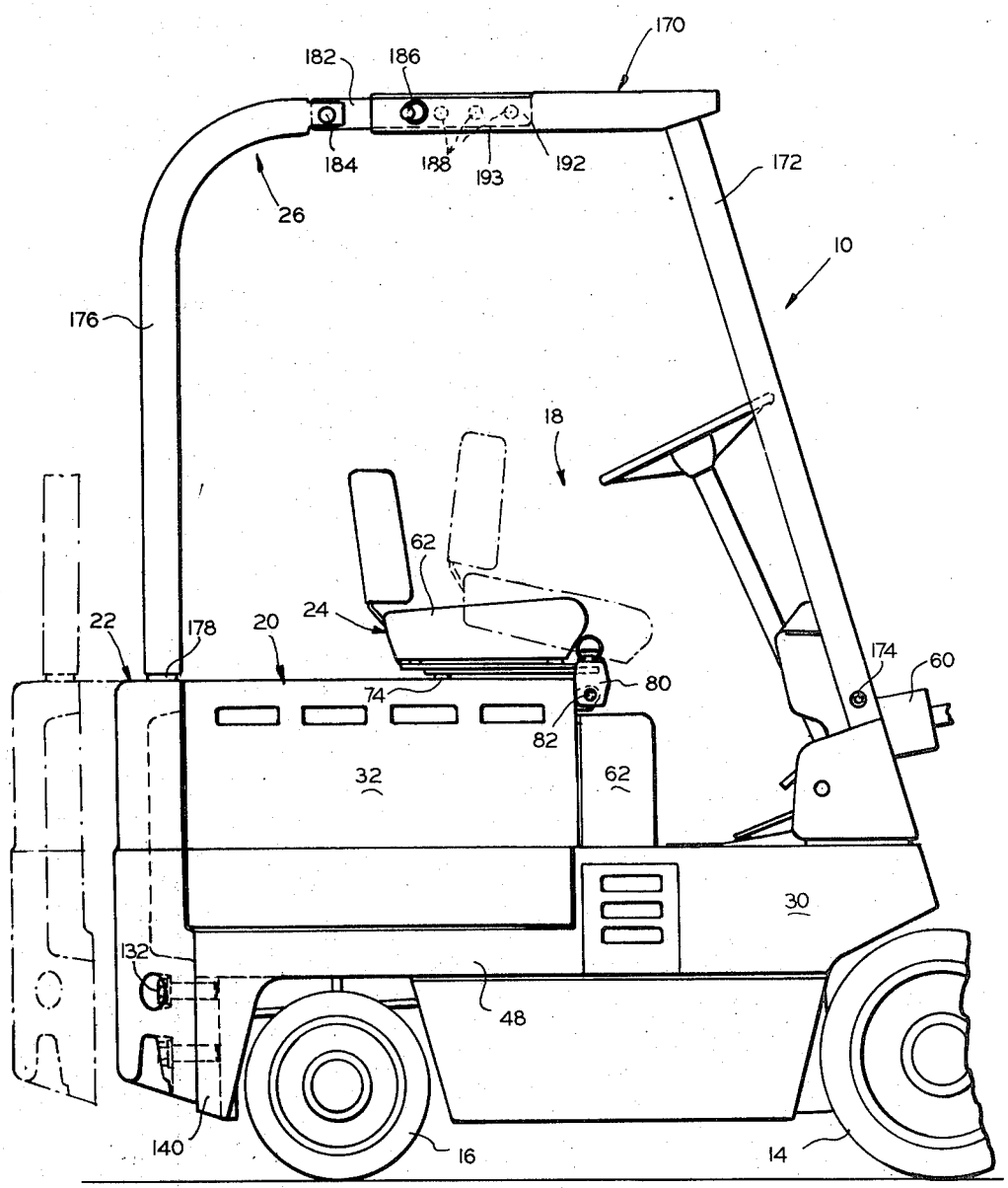
FIG. 1 is a partial side view in elevation showing my invention as applied to an electric powered industrial lift truck.

Referring now to the drawing, numeral 10 designates an electric counterbalance lift truck which includes a lifting mast assembly 12 (FIGS. 10 and 11) mounted from the front axle and of generally conventional design having a lifting carriage and fork (not shown) mounted for vertical movement thereon, forward drive wheels 14, rear steer wheels 16, an operator and control station 18, and a battery compartment 20 formed generally within the body, a main frame and adjustable counterweight 22 of the truck and beneath an operator's swing-out seat assembly generally designated at 24. An adjustable overhead guard assembly is illustrated generally at numeral 26.

The battery compartment 20 is formed longitudinally between the forward surface of the counterweight assembly and a vertical transversely extending front body plate member 28 secured at opposite ends to longitudinal truck frame members 30, is formed laterally between manually demountable vertical longitudinally extending side plates members 32, and is formed vertically between a battery support floor and truck frame member 34 which is secured at its longitudinal and forward transverse edge portions to longitudinal and transverse truck frame members. The top of the battery compartment is normally closed by a hood plate 40 suitably hinged at 42 (FIGS. 9 and 10) to forward plate 28 for forward pivotal movement when seat assembly 24 is located in the swing-out position shown in FIG. 2 and other figures, as will be described in detail below, to provide access to the storage battery 44 which is in operation located in the compartment and supported by floor portion 34. Suitable notches 156 are provided at each upper corner portion in the forward face portion of the counterweight and in plate 28 for receiving the ends of an upper turned or hooked over edge portion 46 of each side plate 32 which, when mounted, covers each open side portion of the battery compartment between the counterweight and the forward transverse plate member 28. Formed longitudinally along the lower portion of each side plate 32 is a recessed section 47 (FIG. 9) of lesser thickness which is adapted to slide behind and register with side body member 48 while the upper hooked edge portion 46 registers as aforesaid in notches 156. The side plate construction is duplicated on each side of the truck and during battery removal and installation both side plates 32 are removed.

The operator's station 18 includes the usual lift truck controls such as a steer wheel 56, instrumentation panel 58, lift, lower and tilt controls for the mast assembly 12, accelerator and brake controls, and forwardly located mast tilt cylinders 60, truck motor control circuitry being housed in the compartment within cover 62 immediately adjacent forward body plate 28, none of said trucks controls or operating devices being of relevance insofar as the present invention is concerned.

The pivotable swing-out operator's seat assembly 24 comprises an important part of the invention and will now be described in detail. It is illustrated in various positions of operation in FIGS. 1–4 and 10. The seat per se is denoted by numeral 62 and may be of conventional design preferably embodying spring type cushions for driver comfort. It is mounted for forward and rearward sliding adjustment on a seat carrier plate 64 by conventional T-shaped slotted track means 66 secured at opposite sides of the bottom surface of the seat and in registry with out-turned flanges of fixed tracks 68 which are secured to the body supporting plate 64. Spring loaded hand-operated linkage means 72 of known construction is operable to release the seat structure for forward and rearward sliding adjustment as movable track portions 66 are actuated along fixed track portions 68 for adjustment in the manner indicated in FIG. 3 by the solid line and broken line showings of the backrest portion of the seat.

Figure 2:
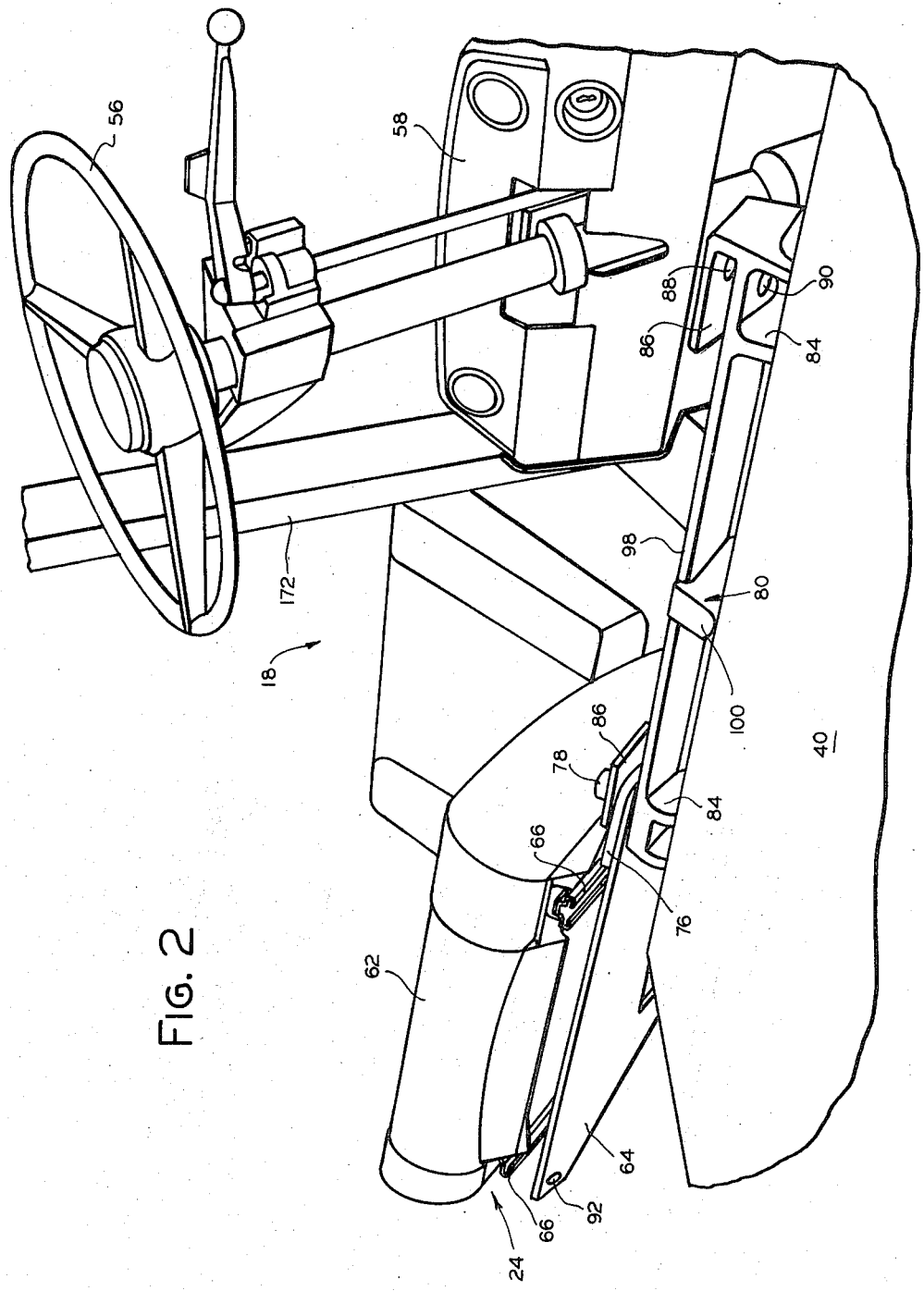
FIG. 2 is an enlarged perspective view showing a portion of the driver's station of FIG. 1 wherein the operator's seat has been actuated to a full outwardly pivoted location relative to the station.

Seat support plate 64 is of a generally U-shaped configuration, as best shown in FIG. 5, having short cylindrical support buttons 74 adjacent the outer ends of the legs of the plate for supporting the plate in a position generally parallel to and spaced vertically from hood member 40 when an operator is located on the seat, which is the position of the seat shown in solid lines in FIGS. 1, 3 and 4. Plate 64 has a front left corner reinforcing and spacer plate portion 76, which corner portion is pivotally mounted by a pivot pin 78 from the left end portion of a transversely extending seat assembly mounting casting 80 which is supported for forward pivotal movement about a pair of transversely spaced horizontal pivot pins 82 from a normal operating position thereof as shown in FIG. 1 to a forwardly pivoted position thereof as best shown in FIG. 2. Mounting member 80 includes generally inverted U-shaped end bracket portions 84 having vertically spaced and inwardly extending corner plate portions 86 mounted from each said bracket portion 84 and axially aligned openings 88 and 90 formed in the respective spaced plate portions at both ends of seat mounting 80. Complementary openings 92 are formed in opposite front corner portions of plate 64, said pivot pin 78 being mounted to extend through the respective openings 88, 90 and 92 for swinging movement of the seat assembly to and from the left side of the truck, a locking pull-out pin and hand ring 96 being registrable with right side openings 88, 90 and 92 when the seat plate 64 is in normal operating position in the space between upper and lower plate portion of right end bracket 84, said pin 96 maintaining the seat in said portion except, of course, when the pin is removed for pivoted swing-out operation of the seat as shown. Mounting member 80 includes a connecting top plate member 98 between the end brackets 84 and a central downwardly extending projection 100 adapted to operate a safety brake on the truck to engage the truck motor shaft for braking whenever the operator vacates the seat. The brake is disengaged when the operator is located on the seat, the brake per se being of conventional design as generally shown in FIGS. 3 and 4. The type of brake shown is generally denoted as a "dead man" brake.

When the seat assembly is in the position shown in solid lines in FIGS. 3 and 4 for operation of the truck the weight of the operator pivots the seat assembly with mounting member 80 about support pins 82 in a counterclockwise direction as seen in FIG. 3 such that projection 100 abuts a lever 102 which is mounted from a bracket 104 secured to forward body plate 28 in a U-shaped cutout portion 106. A link 108 is pivotally connected to the opposite end of lever 102 for operating a conventional internal expanding shoe cam and lever actuated drum brake shown generally at 110 which is mounted from the chassis below the battery supporting floor 34 for braking the shaft 112 of the truck electric drive motor 114. A main brake actuating lever 116 is connected to link rod 108 and is actuated to apply the brake by a tension spring 118 connected at its fixed end to a chassis mounted bracket 120 and at its movable end to the one end of lever 116. When the operator is seated clockwise actuation of lever 116 (FIG. 4) releases the brake by extending spring 118, whereas when the operator departs the truck brake spring 118 actuates the linkage assembly to disengage the brake which spring action also effects forward pivotal movement of the entire seat assembly and mounting 80 therefore through link and lever 108, 102 operating upwardly against projection 100, the spring 119 having sufficient force to actuate lever 102 counterclockwise to pivot the entire seat and mounting structure forwardly about pins 82. The seat is shown in such a forwardly pivoted position in broken lines in FIG. 1 and also in FIGS. 2 and 5. The construction of brake assembly 110 per se is not a part of this invention, and is not therefore described in detail herein.

With the seat 62 swung-out on plate 64 to the approximate 180° transversely displaced position best illustrated in FIGS. 2 and 3, it is apparent that hood member 40 can be elevated as shown in FIGS. 9–11, thereby exposing the top side of battery compartment 20, and that each side plate member 32 can be readily removed manually from the connection thereof to forward plate 28, longitudinal chassis member 48, and the counterweight notch 156, thereby exposing also the sides of the compartment.

The counterweight construction shown in FIGS. 1 and 5–7 comprises a cast or fabricated mass of metal 130 supported from the rear end of the truck for the well-known purpose of counterbalancing balancing loads supported forwardly of the front drive axle for elevation on mast 12. The counterweight as shown is secured to the truck by seven studs 132 mounted in various shaped cavities 134, 136 and 138 in the rear portion of the counterweight, which cavities permit recessing of the stud heads and access thereto for removal. A recess adapted to receive a tow bar end is formed centrally of the counterweight and is associated with axially aligned vertical openings 144 which extend downwardly from recess 138 for receiving a tow bar connector pin, not shown. Studs 132 connect the counterweight to a downwardly extending apron 140 of the truck frame having tapped openings formed therein which are adapted to align axially with the corresponding openings 134, 136 and 138 of the counterweight.

A generally rectangular shaped recess 150 is formed inside the counterweight for receiving any selected one of a plurality of supplementary counterweight slabs, as may be required for different capacity trucks, which slabs are secured to the inner transverse surface portion of the recess by four studs such as 154. A recessed edge portion 52 of the counterweight may be observed well in FIG. 5, notches 156 at either side of the counterweight being formed in said recessed portion 52. The thickness and weight of a relatively large supplementary counterweight 152 may be varied as aforesaid in the manner indicated, for example, counterweight portion 160 of thinner cross-section than 152 as represented by the broken line in FIG. 7, which is also adapted to be secured in the recess 150 by studs shorter than 154. For relatively small capacity trucks it is desirable to use no supplementary counterweight in recess 150, and for such small capacity trucks the counterweight is ordinarily secured directly to apron 140 without the use of intermediate spacer members such as illustrated in FIG. 7 at numerals 162 and 164. The broken line in the spacer in FIG. 7 represents the outer boundary surface or thickness of spacer 164, which is adapted to be used in conjunction with supplementary counterweight 160. For example, a 6000 pound capacity truck may be designed to utilize no supplementary counterweight and no spacer member, whereas a 7000 pound capacity truck may utilize supplementary counterweight 160 and spacer member 164, and an 8000 pound capacity truck may utilize the largest supplementary counterweight 152 and the longest spacer member 162. The counterbalancing effect, of course, is varied as required for each size of truck. It is understood, of course, that sets of varying length studs 132 and 154 will be utilized as required for the different thickness of supplementary counterweights and spacer members. Also, cover or hood member 40 and side plates 32 will be available in various lengths when the truck is being assembled as appropriate for the variable length of compartment 20 depending upon the particular capacity load for which the truck is designed.

The above exemplary variations enable a single basic truck chassis to be utilized for varying load capacity requirements simply by varying the counterweight mass and effective counterbalancing moment arm about the front axle, as described above. Also, it should be noted that the battery compartment floor member 34 is located to rest on the spacer members so that electric storage batteries, for example, of varying size and capacity can be installed depending upon the truck capacity desired.

The overhead protective guard structure 26 comprises a pair of parallel, transversely spaced, generally inverter U-shaped side rail assemblies 170. Each such side rail assembly has a forward rail portion 172 which extends up and over the operator's station and is secured to the respective front side portion of the truck by a stud 174, and a rear rail portion 176 which extends up and over the rear portion of the truck, being secured to the upper surface of the counterweight by a bracket and bolt assembly 178 which connects the rear portions securely to tapped openings 179 formed in the upper end of the counterweight. Forward leg portions 172 are secured together also by a horizontal protective bar grid 180 which terminates at the rear end of rail portions 172. The right side longitudinally aligned pair of front and rear rail portions 172 and 176 are adapted to be connected together by a link 182 which is pivotally secured at its rear end to rear rail 176 by a bolt 184 and which is longitudinally adjustably connectible to the corresponding front rail portion by a pull pin member 186. A plurality of adjustment openings 188 are present in link 182, any one of which may be selected to register with an opening 190 in the rear portion of the respective forward rail portion 172 depending upon the desired adjustment range of the guard assembly 26. The rear portion of right side rail 172 is formed to provide a longitudinally extending U-shaped recess 192 for receiving link 182 in a selected adjusted position longitudinal of the truck. Details of the connecting link 182 and adjacent connected portions of the front and rear protective guard rails 172 and 176 are best shown in the plan view of FIG. 8. It will be noted that link 182 is pivotable upwardly only about pin 184 inasmuch as the slotted U-portion 192 provides a floor 193 providing structural rigidity and strength of the guard equivalent to standard overhead guard construction.

The left side rail portions 172 and 176 are connected together by a link 183 (FIG. (9) which may be of the same construction as link 182 except that link 183 is not pivoted to left rail portion 176, but is secured thereto as by welding, the connection thereof to left rail portion 172 being longitudinally adjustable by means of openings 188 and 190 and a pull pin 186 the same as is link 182. A more rigid guard structure is thus provided than would be the case if, for example, pivoted links 182 were used on both sides of the guard, although such structure may, of course, be found desirable in some cases with the provision of additional support to prevent sagging of the guard in the event both such links were pivoted to provide simultaneously openings 196 on both sides of the guard.

For each available longitudinally adjusted position of counterweight 22 is a corresponding longitudinally adjustable position of the overhead guard 26 so that in any adjacent position of the counterweight as described above the connecting links 182 and 183 are adjusted such that pins 186 and openings 190 register with selected ones of openings 188 whereby bracket and bolt portion 178 of each rail portion 176 is registrable with the corresponding tapped opening 179 in the counterweight.

Thus, in factory assembly of the truck all necessary parts and adjustments are available to provide a completely enclosed power source compartment for any one of a plurality of longitudinally adjustable positions of the counterweight for various capacities of lift trucks. In addition, all of the foregoing described features combine to provide an extremely novel method and means for removing the power source, such as the storage battery illustrated, without removing any of the parts of the truck except the readily demountable side plate members 32.

Illustrated in FIGS. 10 and 11 in side and rear perspective views is a lift truck which embodies my invention wherein the various truck parts involved in removal or installation of storage battery 44 are illustrated in operative positions to enable such removal or deposit. The overhead guard is shown conditioned to provide an opening 196 between the right front and rear rail portions, right side pin 186 having been removed from openings 188, 190 and the connecting link 182 located in an upwardly pivoted position as shown. The seat assembly 24 is located in its full outwardly extended position, as previously described, the hood 40 is raised as shown, and the side plates 32 are removed. It will be noted that the overhead guard grid structure 180 fully protects the operator from falling objects extending rearwardly as it does over the seat structure while providing an open rear portion of the guard such that with connecting link 182 pivoted to provide opening 196, an overhead chain or cable fall means and hoist 208 or similar lifting equipment can be lowered between the side rails of the guard and/or actuated to pass through opening 196 transversely to the right side of the truck.

As illustrated in FIGS. 10 and 11 the battery is shown to include side plate members having centrally located bracket portions 200 with openings 202 adapted to receive a pair of adjustable hooks 204 of a fixture assembly 206 which is supported from the overhead chain hoist assembly at 210. The operator, as shown, can under these conditions readily lower the fixture 206 below the upper level of the guard by means of the chain hoist and then actuate the fixture 206 over the battery as the chain passes through opening 196, in which position the connecting hooks 204 of the fixture may be connected to the battery brackets 200 and the chain hoist operated to lift the battery from supporting floor 34 and thence move it transversely outwardly of the truck as the chain fall is actuated through opening 196 and the battery is then located for recharging or other maintenance. In a similar manner and by the reverse procedure a fully charged battery can be very quickly installed in the truck. The entire replacement of a power source, such as a storage battery, or other device, can be accomplished within a very short time, which operation has previously required a substantial period of time particularly in such trucks utilizing standard overhead guard equipment.

It will now be understood and appreciated by those skilled in the art that modifications may be made in the structure, form and relative arrangement of parts without necessarily departing from the spirit and scope of the invention, even though I have described and illustrated only a single embodiment of the invention. Accordingly, it should be understood that I intend to cover by the appended claims all such modifications which fall within the scope of my invention.

I claim:

1. An operator's seat assembly for vehicles comprising mounting means connected to and extending transversely of the vehicle, operator's seat means supported from said mounting means, and pivot means adjacent one end of said mounting means connecting said seat to said mounting means, said seat means being movable on said pivot means away from the opposite end of said mounting means to enable said seat means to be actuated from a forwardly facing operative position for operating the vehicle to a rearwardly facing non-operative position in which the seat means extends transversely outwardly of one side of the vehicle, said mounting means and seat means being pivotable about a transverse axis and pivoting forwardly about said axis when said seat means is located in said non-operative position.

2. An operator's seat assembly as claimed in claim 1 wherein said mounting means includes bifurcated end portions adapted to receive in the spaces formed thereby a support portion of the seat means which comprises a member pivotable from the one bifurcated end to said operative and non-operative positions, said member being connectible to the opposite bifurcated end by detachable connecting means.

3. An operator's seat assembly for vehicles as claimed in claim 1 wherein said seat assembly is mounted at the operator's station of an industrial lift truck and which in said operative position extends rearwardly over prine mover or energy source compartment means to the lift truck and which in said non-operative position is remote from said compartment means such that prime mover or energy source means therein may be removed vertically outwardly thereof without interference by said seat means.

4. An operator's seat assembly for vehicles as claimed in claim 1 wherein said pivot means is the sole pivot means enabling the seat means to be actuated from said operative position to said non-operative position.

5. An operator's seat assembly for vehicles as claimed in claim 4 wherein the axis of said pivot means projects in a generally vertical direction.

6. An operator's seat assembly for vehicles as claimed in claim 1 wherein said seat means in said operative position is located generally rearwardly of and in longitudinal alignment with said mounting means and wherein said seat means in said non-operative position is located generally forwardly and transversely of said mounting means.

7. An operator's seat assembly for vehicles as claimed in claim 6 wherein said pivot means is the sole pivot means enabling the seat means to be actuated from said operative position to said non-operative position.

8. An operator's seat assembly for vehicles as claimed in claim 6 wherein said seat assembly is mounted at the operator's station of an industrial lift truck in which said operative position extends rearwardly over prime mover or energy source compartment means of the lift truck and which in said non-operative position is remote from said compartment means such that prime mover or energy source means therein may be removed vertically outwardly thereof without interference by said seat means, said pivot means enabling the seat means to be actuated from said operative position to said non-operative position.

9. An operator's assembly for vehicles as claimed in claim 1, wherein said seat means includes a seat, a carrier plate beneath the seat and track means mounting the seat on the carrier plate for forward and rearward adjustment of the seat on the carrier plate.

10. An operator's seat assembly for vehicles as claimed in claim 1 wherein spring means is provided for pivoting said mounting means and seat means forwardly about said axis when said seat means is located in said operative position, said spring means being ineffective for that purpose when said seat means is located in said non-operative position.

* * * * *